US008757944B2

(12) United States Patent
Calico

(10) Patent No.: US 8,757,944 B2
(45) Date of Patent: Jun. 24, 2014

(54) ADJUSTABLE DECKING SYSTEM FOR SUPPORTING FREIGHT

(75) Inventor: James N. Calico, Pittstown, NJ (US)

(73) Assignee: Ancra International, LLC, Azusa, CA (US)

( * ) Notice: Subject to any disclaimer, the term of this patent is extended or adjusted under 35 U.S.C. 154(b) by 133 days.

(21) Appl. No.: 13/440,391

(22) Filed: Apr. 5, 2012

(65) Prior Publication Data

US 2013/0266393 A1    Oct. 10, 2013

(51) Int. Cl.
*B60P 7/08* (2006.01)

(52) U.S. Cl.
USPC ............. 410/89; 410/143; 410/146; 410/148; 410/150

(58) Field of Classification Search
USPC ........... 410/89, 143, 144, 145, 146, 148, 132, 410/139, 150; 211/105.3, 162, 191, 192, 211/208; 105/370; 248/354.1
See application file for complete search history.

(56) References Cited

U.S. PATENT DOCUMENTS

| | | | |
|---|---|---|---|
| 3,071,086 A | 1/1963 | Dunlap | 105/369 |
| 3,090,329 A | 5/1963 | Rolfe, Jr. | 105/369 |
| 3,095,830 A | 7/1963 | Runken | 105/369 |
| 3,116,702 A | 1/1964 | Stough | 105/369 |
| 5,338,137 A | 8/1994 | Jensen | 410/146 |
| 5,452,972 A | 9/1995 | Adams | 410/89 |
| 6,062,780 A | 5/2000 | Petelka | 410/89 |
| 6,074,143 A | 6/2000 | Langston et al. | 410/89 |
| 6,739,811 B1 | 5/2004 | Petelka | 410/89 |
| 7,578,644 B2 * | 8/2009 | Squyres et al. | 410/89 |
| 2011/0318133 A1 | 12/2011 | Arnold et al. | 410/150 |

OTHER PUBLICATIONS

Ancra International, Lift-a-Deck publication, Catalog B-233A, 16 pages, Oct. 2011.
International Search Report and Written Opinion for PCT/US2013/035251, dated Jul. 9, 2013.

* cited by examiner

*Primary Examiner* — Stephen Gordon
(74) *Attorney, Agent, or Firm* — Brinks Gilson & Lione

(57) ABSTRACT

An adjustable decking system for use in supporting freight is provided. The system includes a pair of tracks configured to be vertically mounted upon opposite walls of a freight container, configured with a plurality of evenly spaced recesses disposed along the length thereof. A bracket is slidably mounted upon the pair of tracks and a lock is pivotably mounted to the bracket and an end of the channel unit. The lock includes first, second, and third fingers extending therefrom which are normally received within three of the plurality of spaced recesses disposed along the track. The lock is being pivotably mounted to the bracket such that the first, second, and third fingers may be withdrawn from the three of the plurality of spaced recesses to allow the position of the channel unit to be vertically adjusted along the one of the pair of tracks.

6 Claims, 5 Drawing Sheets

FIGURE 3
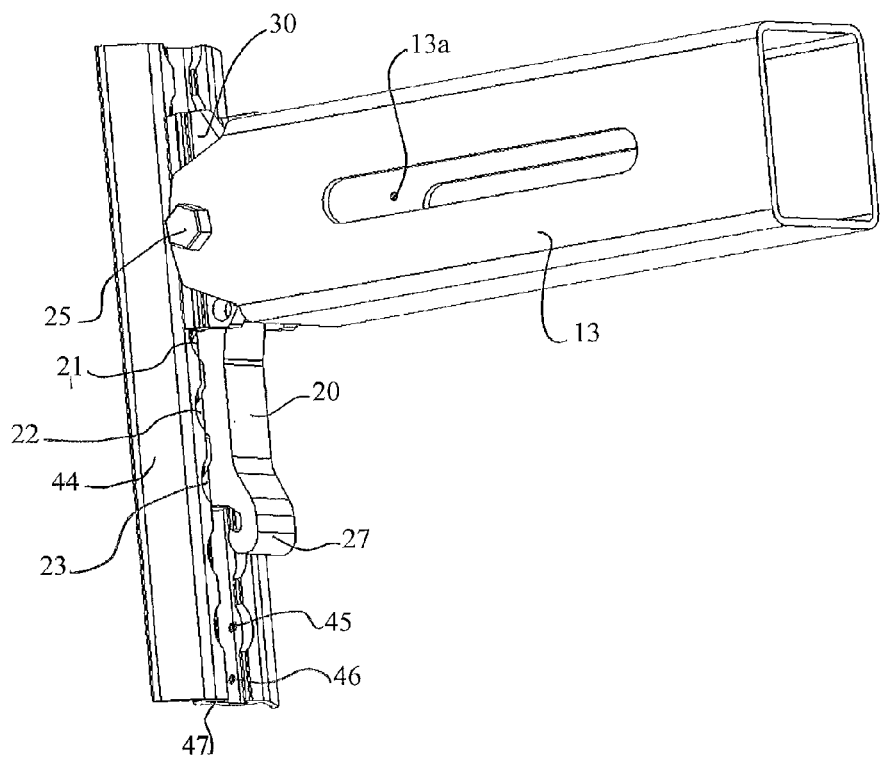
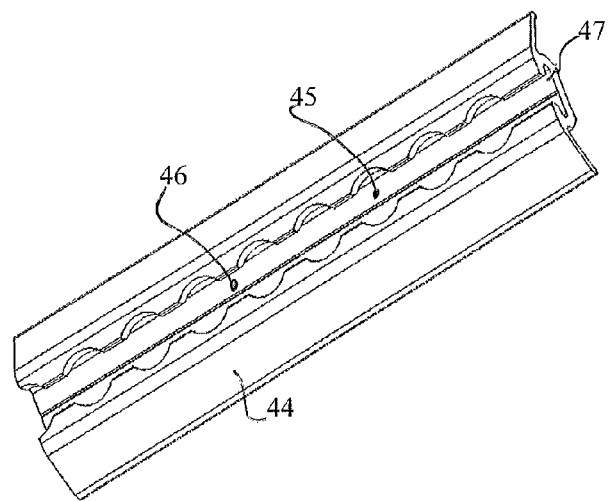
FIGURE 9

ADJUSTABLE DECKING SYSTEM FOR SUPPORTING FREIGHT

TECHNICAL FIELD

This invention related to decking systems for carrying cargo in which the deck height can be adjusted and more particularly to such a system for use in supporting freight in a vehicle compartment.

BRIEF SUMMARY

A first representative embodiment of the disclosure provides an adjustable decking system for use in supporting freight. The system includes a pair of tracks configured to be vertically mounted upon opposite walls of a freight container, each of the pair of tracks configured with a plurality of evenly spaced recesses disposed along the length thereof, and a keyway defined therealong. A beam assembly is provided and includes a beam that slidably receives a pair of channel units on opposite ends thereof. Each of the pair of channel units comprises a bracket slidably mounted to the one of the pair of tracks, and a lock pivotably mounted to the bracket and an end of the channel unit. The lock comprises first, second, and third fingers extending therefrom which are normally received within three of the plurality of spaced recesses disposed along the track. The lock is pivotably mounted to the bracket such that the first, second, and third fingers may be withdrawn from the three of the plurality of spaced recesses to allow the position of the channel unit to be vertically adjusted along the one of the pair of tracks.

A second representative embodiment of the disclosure provides a retention member for aligning a support bar to a vertical mounting structure. The retention member includes a bracket configured to slidably mount within a rigid vertical mounting structure and a lock pivotably mounted to the bracket. The lock comprises first, second, and third longitudinally aligned fingers extending therefrom, the first, second, and third fingers each being configured to be received within neighboring recesses within the vertical mounting structure. The lock is urged toward the track by a spring disposed between opposed bearing surfaces on the lock and the bracket such that the first, second, and third fingers are biased toward engagement with the neighboring recesses in the track. The lock is pivotably movable in an opposite direction to decouple the lock from the track to allow movement of the retention member along the track.

Other embodiments of the disclosure will become apparent in view of the following description taken in connection with the accompanying drawings.

BRIEF DESCRIPTION OF THE DRAWINGS

FIG. 3 is a perspective view of a channel unit mountable to an end of the beam assembly of FIG. 2.

FIG. 9 is a perspective view of the track of FIG. 3.

DETAILED DESCRIPTION OF THE DRAWINGS AND THE PRESENTLY PREFERRED EMBODIMENTS

Figure 4:
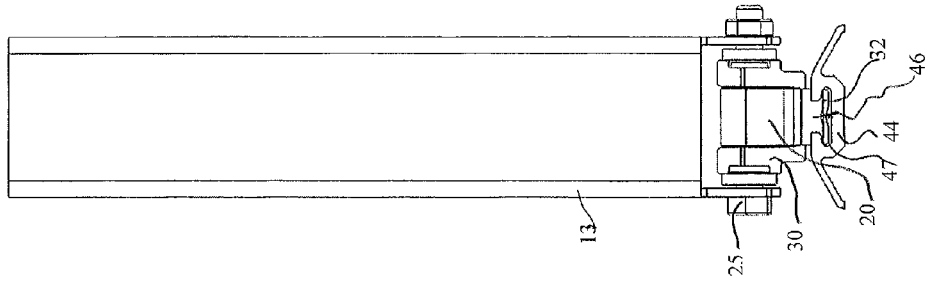
FIG. 4 is an end view of the channel unit of FIG. 3 engaged with a track.

Referring now to FIGS. 1-9, an adjustable shelving system is provided. The system includes multiple pairs of tracks 44 (inclusive of two, three, four or more pairs) are mounted on the side walls of compartment 50, the tracks 44 of each pair being directly opposite each other. Compartment 50 may be the freight carrying compartment of a vehicle such as a truck, a railroad car, an airplane, or the like. The tracks 44 have spaced recesses 45 formed therein, these recesses 45 being arranged along the longitudinal extent of the tracks 44. Tracks 44 are preferably mounted such that opposed recesses 45 from opposite tracks 44 are aligned at the same heights within the compartment 50. Recesses 45 are preferably formed at consistently aligned spacings along the length of the tracks 44. In some embodiments, as shown in FIGS. 4 and 9, each track 44 includes a central opening 46 that extends along the length of the track 44, with each recess 45 centered (or otherwise consistently positioned along the length of the track 44) within the central opening 46. In some embodiments, the central opening 46 may additionally define a keyway 47 along the length of the track 44. In some embodiments, best shown in FIG. 9, the plurality of recesses 45 are arcuate (and may be bisected by the central opening 46) with equal curvature on either side of the central opening 46. In other embodiments, the recesses 45 may be square or other shapes that include surfaces to support a finger (discussed below) disposed therethrough.

Figure 1:
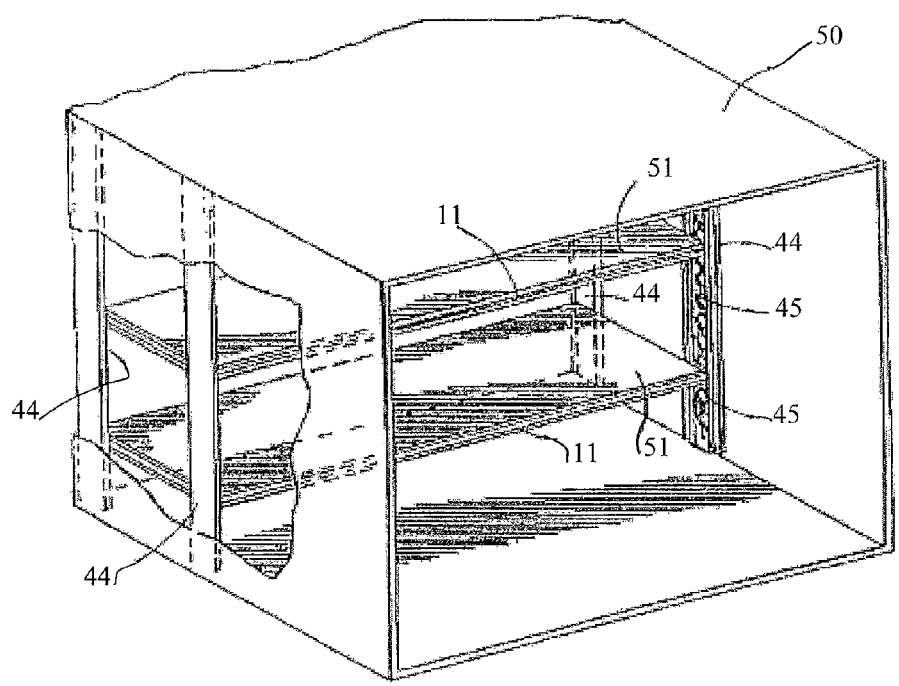
FIG. 1 is a perspective view of a typical cargo container of a truck with an adjustable shelving system installed.

Beam assemblies 11 are supported between tracks 44 and in connection thereto, as shown in FIG. 1. Beam assemblies 11, discussed in greater detail below, may be adjusted to a desired height in engagement with one of the plurality of pairs of opposing tracks. For example, by setting two or more of such beams 11 in two or more pairs of tracks 44 at the same height, a support for shelves 51 disposed upon the two or more beams 11 is provided. If so desired, the shelves 51 can be dispensed with and the beam assemblies 11 used to directly support cargo containers or the like. An additional beam assembly 11 may be disposed upon a rearwardly (with reference to the forward and rear ends of the cargo compartment 50) mounted pair of tracks 44, and at a height above the other mounted beam assemblies 11 to provide a rear support for cargo disposed upon the aligned beam assemblies 11.

Figure 2:
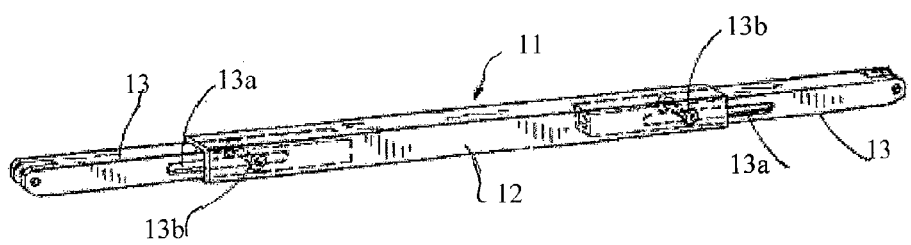
FIG. 2 is a perspective view of a beam assembly usable with the cargo container of FIG. 1.

Referring now to FIG. 2, beam assembly 11 is formed form a hollow beam member 12, and a pair of similar channel units 13 slidingly and partially telescopically attached to the beam member 12 at opposite ends thereof. Each channel unit 13 includes a slot 13a that receives a pin 13b connected to the beam member 12, with the length and positioning of the slot 13a establishing the potential range of extension and telescoping of the beam member 12 and the channel unit 13.

A representative channel unit 13 is depicted in FIG. 3, and includes a bracket 30 and a lock 20 each pivotably mounted to the channel unit 13. In some embodiments, the bracket 30 is pinned to the channel unit 13, while in other embodiments, the bracket 30 is otherwise connected to the channel unit 13. The bracket 30 preferably includes a key 32 that is slidably mounted within the keyway 47 to maintain the bracket 30 (and therefore the channel unit 13) engaged with the track 44, regardless of the position of the lock 20 with respect to the track 44. The bracket 30 additionally may include a bearing surface 33 that mates with the spring 38, discussed below.

Each channel unit 13 additionally includes a lock 20 that is pivotably mounted to the bracket 30 with a pin 25. Each lock 20 includes a plurality of fingers, which are each shaped and aligned to extend within a one of the plurality of recesses 45 disposed within the track 44. In some embodiments, the lock 20 may support three fingers 21, 22, 23, each longitudinally aligned upon the lock 20 to pivotably engage three aligned recesses 45 upon the track 44. In other embodiments, the lock 20 may include two or four fingers extending therefrom. The first, second, and third fingers 21, 22, 23 may be aligned upon the lock 20 with a plane extending through a longitudinal axis of each finger.

Figure 7:
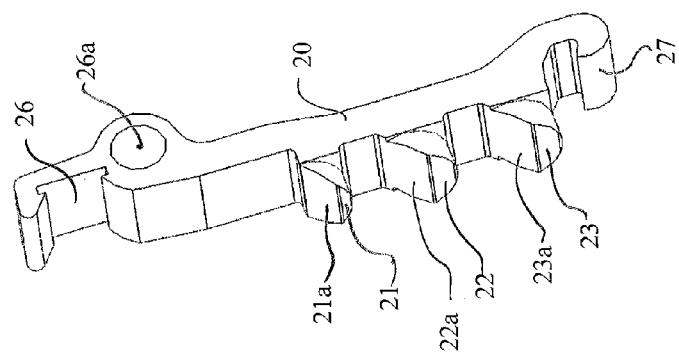
FIG. 7 is a perspective view of the lock of FIG. 3.

In some embodiments, as best shown in FIG. 7, at least a portion each finger, such as the first, second, and third fingers 21, 22, 23, has a substantially circular or arcuate profile at a lower portion thereof (as the lock 20 and bracket 30 are mounted upon the vertically oriented track 44) that is configured to fit in close registry with three aligned recesses 45 within the track 44. In some embodiments the fingers 21, 22, 23 may be formed with shapes and geometries that are similar to the shape of the plurality of recesses 45 within the track 44.

Figure 8:
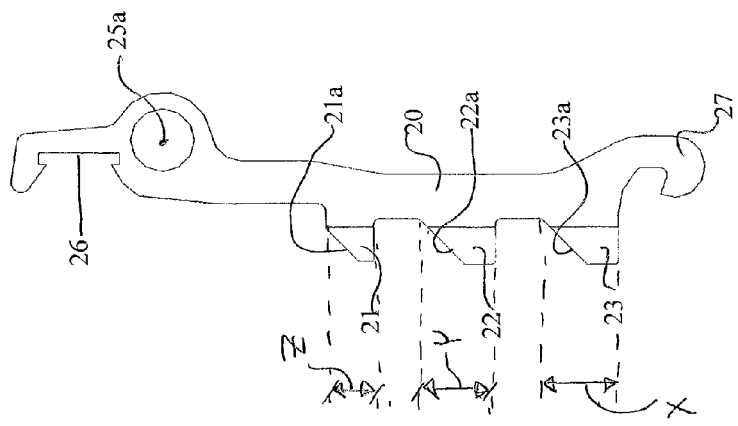
FIG. 8 is a side view of the lock of FIG. 3.

In some embodiments, the three (or other numbers) of fingers disposed upon the lock 20 are configured with the same profile. In other embodiments, as best shown in FIG. 8, at least the upper finger 21 (as the channel unit 13 is disposed within the track 44) is shaped with a smaller width (Z) than widths (Y, X) of the remaining two fingers 22, 23. It has been found that a smaller upper finger 21 is beneficial because it increases the clearance between the upper finger 21 (which is the finger that maintains the longest contact with a recess 45 as the lock 20 is being rotated away from the track 44) and the recess 45. In some embodiments, each (or some) fingers 21, 22, 23 may be formed with an oblique surface defining the opposite side of the finger from the circular profile, which assists with releasing the fingers 21, 22 23 (especially to upper finger 21) from the recesses 45 as the lock is rotated (compare FIGS. 5 and 6), providing further clearance for the pivoting fingers 21, 22, 23 from the track 44.

It has been found that embodiments with three fingers (first, second, and third fingers 21, 22, 23) allow for one or more of smaller and more compact locks 20, fingers (21, 22, 23), tracks 44, recesses 45 and the like because the load supported by each beam 11 is ultimately transferred to the compartment 50, at three points, rather than either at a single point or at two points, which allows the overall load to be carried across three fingers, with each finger each carrying only around ⅓ of the load carried by each end of the beam 11. Similarly, the use of three fingers in combination transferring to the load to the track 44 may allow for a material with lower strength, weight, or cost to maintain sufficient strength and factor of safety to suitably carry the rated load for the system. Moreover, it is believed that the design where the total load is carried by three fingers (instead of a single finger or two fingers) is beneficial because the wear upon the fingers, due to high friction connections between the finger(s) and the opposed recesses being reduced due to the reduction in the percentage to total load being carried by each finger.

Figure 5:
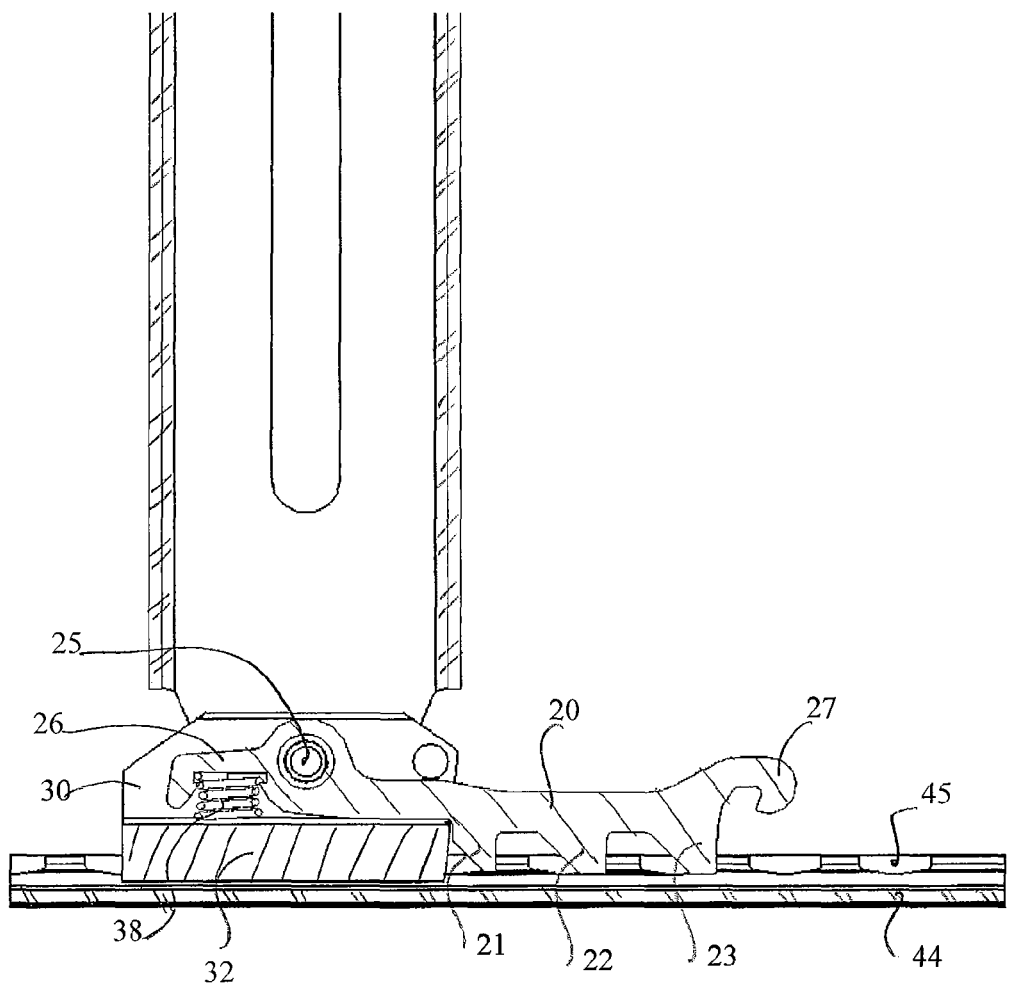
FIG. 5 is a side cross-sectional view of channel unit of FIG. 3, showing the fingers from the lock engaged with recesses in the track.
Figure 6:
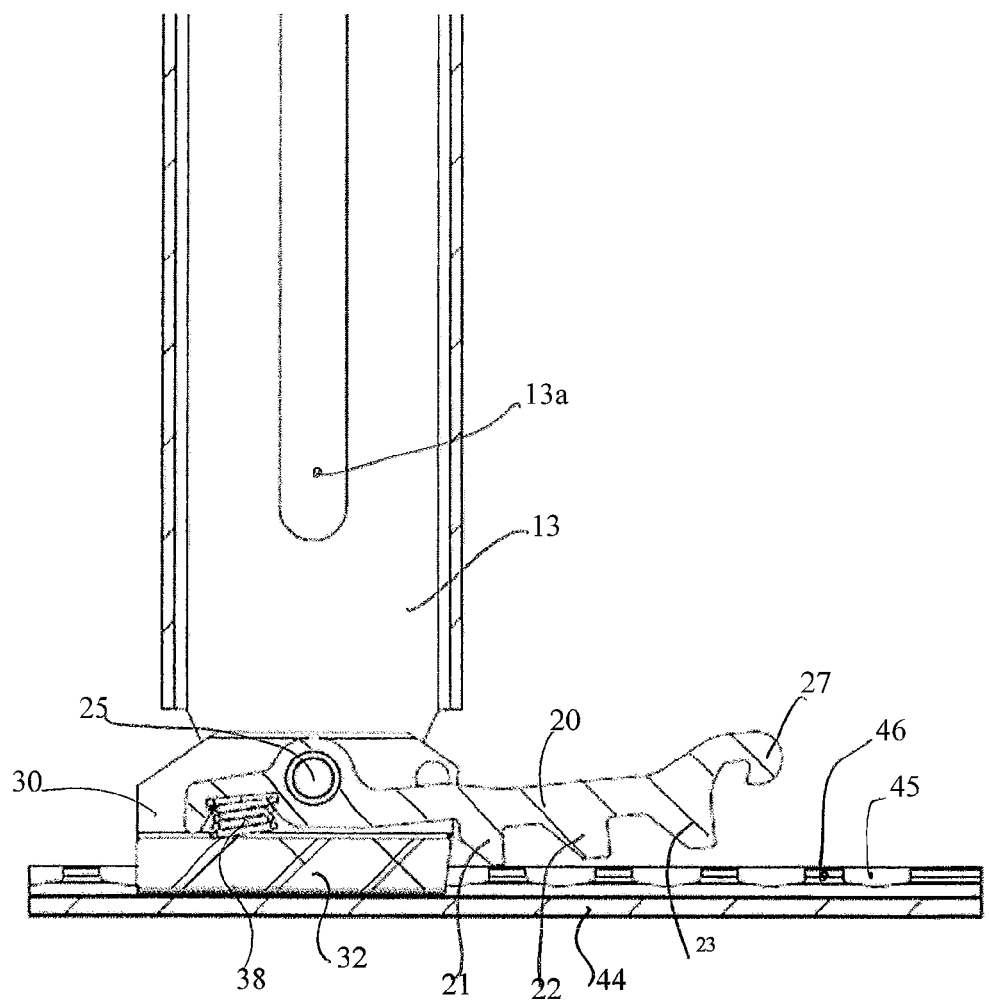
FIG. 6 is the view of FIG. 5 showing the lock rotated to release two of the three fingers from the recesses in the track.

As shown in FIG. 5, the lock 20 is continuously pivotably urged toward the track 44, and specifically such that the first (upper), second (middle), and third (lower) fingers 21, 22, 23 engage the opposed recesses 45 by one or more springs 38 that are disposed between the lock 20 and the bracket 30. In some embodiments, the spring 38 may be a helical spring, or a leaf spring that is disposed between a bearing surface 26 upon the lock 20 and a bearing surface 33 on the bracket 30. A tab 27 is formed on the lower end of each lock 20 (as the lock 20 and the bracket 30 are mounted upon the vertical track 44) to enable remote manipulation to pivot the lock 20 with respect to the bracket 30 to withdraw the fingers 21, 22, 23 from their respective recesses 45, as shown in FIG. 6 (with the second and third fingers 22, 23 disengaged from their respective recesses 45, while the first finger 21 still is slightly engaged with its recess 45). As can be understood with reference to FIGS. 3 and 6, pivoting the lock 20 away from the track 44 allows for adjustment of the height of the channel 13 (and therefore beam 11) within the track 44. Stop members (not shown) may be installed in tracks 44 to limit the lowest position of the channel 13.

While the preferred embodiments have been described and illustrated in detail, it is to be understood that this is intended by way of illustration and example only, the scope of the invention being limited by the terms of the following claims.

The invention claimed is:

1. An adjustable decking system for use in supporting freight, comprising:
   a pair of tracks configured to be vertically mounted upon opposite walls of a freight container, each track of the pair of tracks configured with a plurality of spaced recesses disposed along a length thereof, and a keyway defined therealong;
   a beam assembly comprising a beam and slidably receiving a pair of channel units on opposite ends thereof;
   each of the pair of channel units comprising a bracket slidably mounted to respective opposite tracks of the pair of tracks, and a lock pivotably mounted to the bracket and an end of the channel unit, the lock comprising first, second, and third fingers extending therefrom which are normally received within three of the plurality of spaced recesses disposed along the respective track, the lock being pivotably mounted to the bracket such that the first, second, and third fingers may be withdrawn from the three of the plurality of spaced recesses to allow the position of the channel unit to be vertically adjusted along the respective one of the pair of tracks,
   wherein a width of the first finger is less than a width of each of the second and third fingers.

2. The system of claim 1, wherein each of said first, second, and third fingers have an arcuate portion that is configured to be received in registration with similar arcuate recesses within the track.

3. The device of claim 2, wherein said first, second, and third fingers each comprise an oblique portion disposed opposite a circular portion upon each finger.

4. The device of claim 1, wherein the lock comprises an arcuate portion at a bottom end thereof that is configured to be directly or remotely manipulated to rotate the lock to disengage the first, second, and third fingers from the three of the plurality of spaced recesses upon the respective track.

5. The device of claim 1, wherein the bracket includes a key that is slidably mounted within the respective keyway.

6. The device of claim 1, further comprising a helical spring disposed between opposed bearing surfaces of the bracket and the respective lock, the helical spring configured to bias the lock toward engagement between the first, second, and third fingers and the three of the plurality of recesses upon the track.

* * * * *